United States Patent [19]
Yasuda

[11] Patent Number: 4,780,247
[45] Date of Patent: * Oct. 25, 1988

[54] METHOD FOR CONTROLLING STEADY STATE EXOTHERMIC TEMPERATURE IN THE USE OF HEAT SENSITIVE-ELECTRICALLY RESISTANT COMPOSITES

[76] Inventor: Shigeyuki Yasuda, 2-27 Imaike-minami, Chigusa-ku, Nagoya, Japan

[*] Notice: The portion of the term of this patent subsequent to Dec. 12, 2003 has been disclaimed.

[21] Appl. No.: 905,747

[22] Filed: Sep. 9, 1986

[30] Foreign Application Priority Data

Sep. 18, 1985 [JP] Japan ................................. 60-207486

[51] Int. Cl.$^4$ ............................................... H01B 1/06
[52] U.S. Cl. .................................... 252/510; 252/511; 252/502
[58] Field of Search ................ 252/510, 511; 524/495, 524/496; 219/548; 428/209

[56] References Cited

U.S. PATENT DOCUMENTS 4,629,584 12/1986 Yasuda et al. ...................... 252/510

Primary Examiner—Josephine Barr
Attorney, Agent, or Firm—Koda and Androlia

[57] ABSTRACT

A method of controlling the steady state exothermic temperature in the range from 5° to about 60°–70° C. in polyethylene glycol-carbon powder system heat sensitive-electrically resistant composites including setting the steady state exothermic temperature by varying the molecular weight of polyethylene glycol within a range of approximately 100 to 1,000,000 while setting the amount of the carbon powder dispersed in polyethylene glycol within a range from 5 to 45 wt %.

2 Claims, 4 Drawing Sheets

METHOD FOR CONTROLLING STEADY STATE EXOTHERMIC TEMPERATURE IN THE USE OF HEAT SENSITIVE-ELECTRICALLY RESISTANT COMPOSITES

BACKGROUND OF THE INVENTION

1. Field of the Invention

The present invention relates to polyethylene glycol-carbon powder system heat sensitive-electrically resistant composites which are capable of performing the self-temperature control by showing the steep increase in electrical resistance at certain temperatures when they are used as plane heaters, and also to a method for controlling the steady state exothermic temperature for the foregoing composites.

2. Prior Art

The detailed proposals with respect to polyalkylene oxide-carbon particle system self-temperature controlling exothermic composites, which constitute the basis of this invention, have already been made by the inventor in the Japanese laid-open Pat. No. 1984-110101 and No. 1985-140692 (U.S. Ser. No. 649,535). When power is supplied, the temperature of these composites increases, and when the temperature reaches a point above a certain temperature, the value of the electric resistance of these composites increases sharply thereby causing a sharp decrease in current.

On the contrary, when the temperature of the composites is brought down by cooling the composites from the outside, the value of electric resistance decreases and the current increases. Making use of this property, heaters can be obtained wherein the composites are maintained at constant temperatures. The electrically resistant mentioned above are called PTCR (Positive Temperature Coefficient Resisters). Conventionally, barium titanate has been known as an inorganic PTCR, while polyethylene-carbon particle mixed systems have been known as an organic PTCR.

However, the barium titanate heater is disadvantageous in that it is impossible for it to bring the steady state exothermic temperature down to 70° C. or below; and also in that it is not appropriate for obtaining a plane heater having a large area because it is a sintered body. Besides, it is high in price. Also, its effect as a PTCR is not as high as polyethylene oxide-carbon particle mixed system. However, the polyethylene (paraffin)-carbon particle system has a compatibility problem. Therefore, it is still being studied.

The foregoing polyalkylene oxide-carbon particle system self-temperature control heater (i.e. exothermic) composite is highly stable, and it is a new heater with which high PTCR effect can be effected. Furthermore, its steady state exothermic temperature has the feature that, as long as the concentration of the carbon particles stays within a certain range, it remains almost constant even when the concentration varies to some minor extent. When the concentration of the carbon particles is lowered to a point below the foregoing range, the exothermic temperature begins to vary greatly depending on proportional to the concentration. However, when viewed from the standpoint of practical application, it is not desirable to use such a composite, in terms of quality control, because a slight variation in the amount of the carbon particles (for example, graphite) causes substantial differences in the electric characteristics of the products.

The inventor has further confirmed that, as a technique to stabilize and to optionally control the steady state exothermic temperature, when a third material, such as water or, alcohol, is added, the above mentioned stabilization and optional control become feasible (Japanese laid-open Pat. No. 1986-39475).

However, the means and the composite which makes it possible to set the steady state exothermic temperature at a preferred temperature within the same composite without adding a third material, etc. as mentioned above, have not yet been found.

SUMMARY OF THE INVENTION

The present invention, therefore, intends to solve the problems accompanying conventional heat sensitive-electrically resistant composites. Therefore, the object of this invention is to provide the means and the composites with which a steady state exothermic temperature can be optionally and stably controlled to a preferred temperature with the same composite without depending on the addition of a third material.

The foregoing object of this invention was achieved through the discovery of the polyethylene glycol (hereinafter abbreviated as PEG)-carbon powder systems. The discovery was made by the inventor after conducting various studies with regard to the aforementioned means and composites.

That is, by varying the molecular weight of the PEG with a specified amount of carbon powder dispersed in it, to be high or low, the steady state exothermic temperature is controlled to the necessary temperature for optionally setting the steady state exothermic temperature at either a high or low point. The composites used in this method are obtained by homogeneously mixing carbon powder in an amount of 5 to 45 wt% to 100 wt% of the PEG of about 100 to 1,000,000 preferably 200 to 50,000 in average molecular weight. For mixing, the PEG is used in the form of a single component or a mixture of not less than two types of PEGs.

When such method is used for preparing the composites for controlling temperature under the supply of the electric power, the current flows through them since the composites are low in electric resistance when the temperature is low. As a result, the temperature of the heater (exothermic body) increases. When the temperature approaches a certain degree, the value of the resistance increases abruptly. Consequently, the current becomes less. In this way, the heater gives off heat at a constant rate (steady ste exothermic temperature). When the molecular weight of the PEG is low, the steady state exothermic temperature is low and the steady state exothermic temperature is high when the molecular weight of the PEG is high.

In this manner, the object of the invention is achieved.

DETAILED DESCRIPTION OF THE INVENTION

Figure 1:
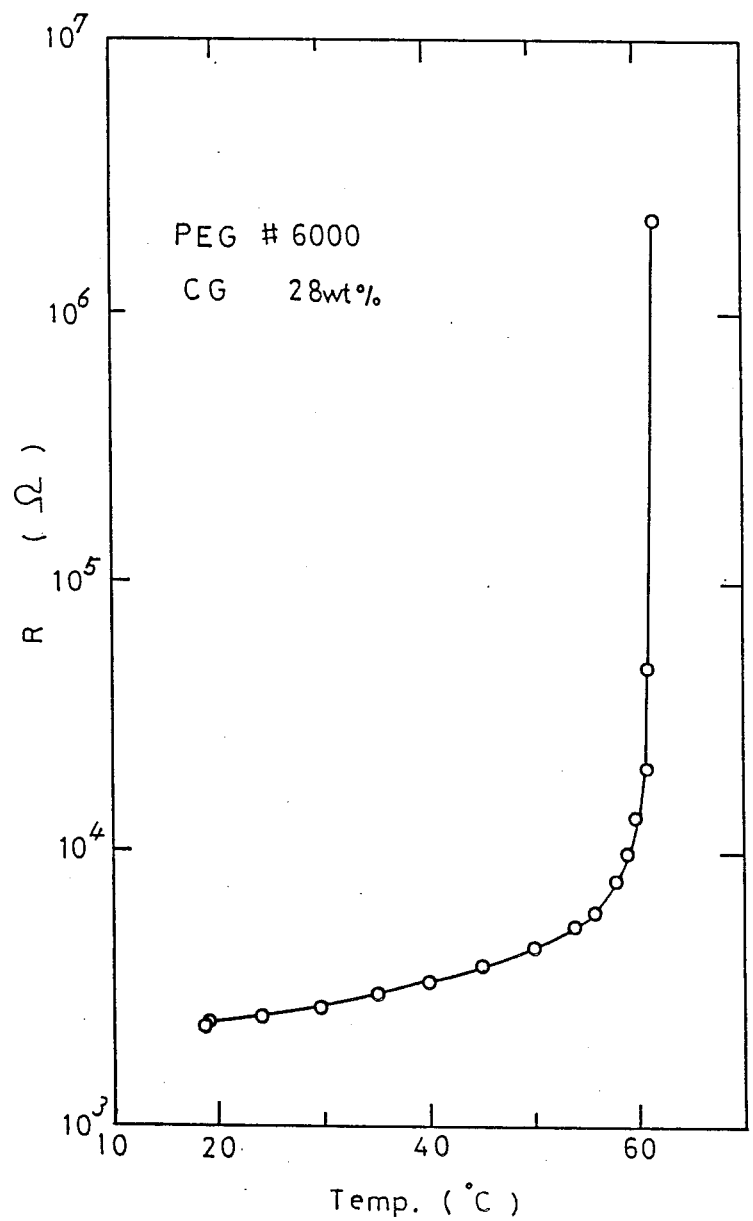
FIG. 1 is a graph showing the relation between the temperature and the electric resistance of the heat sensitive-electrically resistant composite.
Figure 2:
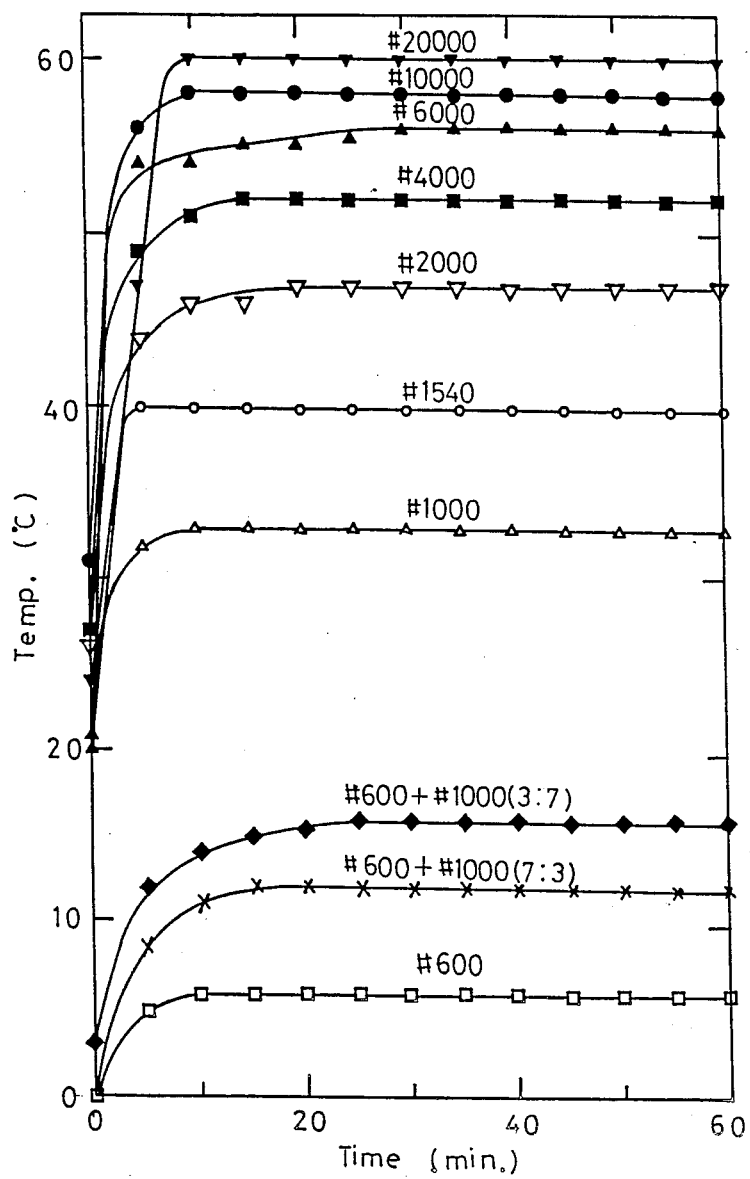
FIG. 2 is a graph showing the relation between the time elapsed and the exothermic temperature in the case when the molecular weight of the PEG in the heat sensitive-electrically resistant composite (PTCR) is varied.

FIGS. 1 and 2 show the properties of the PEG-carbon powder systems as the heat sensitive-electrically resistant composites (PTCR) in concrete forms, based on the actually measured values. The PTCR shown here are those which are made into the plane heaters by a method that will be described later in the "Embodiments".

FIG. 1 shows the results of the measurement of the values of electric resistance of the PEG (#6000)-carbon particle (28 wt%) system plane heater, at respective temperatures. For the measurement, a digital multimeter was used. In the range from the lower temperatures to around 50° C., the value of resistance shows a gradual increase in temperature; but from around 60° C., it shows a sharp increase. This steep increase in value of electric resistance reaches even to two orders of magnitude per degree.

FIG. 2 shows the variation in the exothermic temperature depending on the increase in molecular weight. The results shown in FIG. 2 were obtained by using the PTCR's after making them into plane heaters in the same manner as mentioned previously. After applying 100 V to these plane heaters, the exothermic temperatures at respective points of time elapsed were measured.

Figure 3:
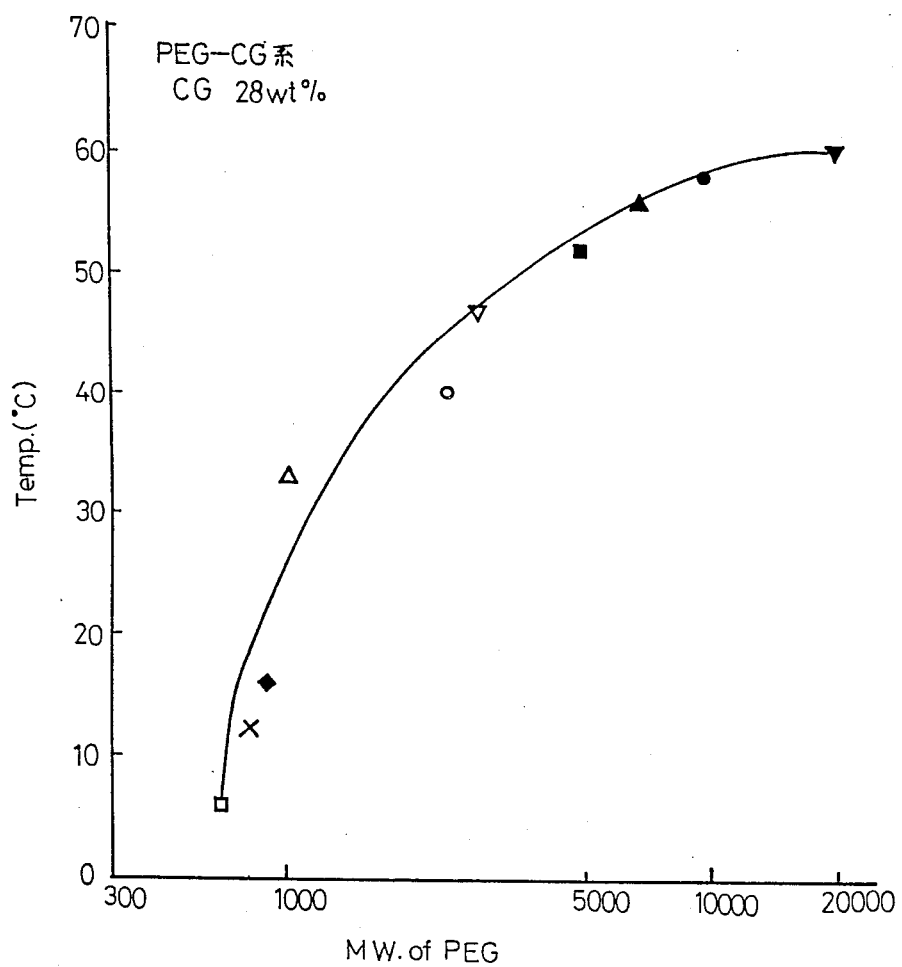
FIG. 3 is a graph showing, likewise, the relation between the molecular weight of the PEG and the steady state exothermic temperature.

As should be apparent from the foregoing results, when the molecular weight of PEG is increased, the steady state exothermic temperature is increased. In other words, of the PEG's used, in PEG #600 with the lowest molecular weight, the steady state exothermic temperature is 6° C., while in PEG #20,000 with the highest molecular weight, the steady state exothermic temperature is 60° C. In between those maximum and minimum molecular weight PEG's, respective PTCR's show the expected steady state exothermic temperatures according to the molecular weights of PEG's in them, as seen in FIG. 3.

The limits for showing the functions as mentioned above are shown in the structure of the means for solving the previously mentioned problems. When the average molecular weight of PEG is lower than 100, the steady state exothermic temperature becomes 0° C. or below, and such composite is low in effect in actual use. On the other hand, when the average molecular weight is 50,000 or above, the steady state exothermic temperature gets into a saturated state. In addition, it becomes difficult to obtain such material itself. Therefore, at the present stage, such a material is also considered inapplicable to the actual use. Thus, within the range between 100 to 1,000,000 preferably between about 200 to 100,000 in molecular weight of PEG, the most desirable range of the steady state exothermic temperature, that is from about 5° C. to about 60°–70° C., can be set to a wide extent. If the PEG's molecular weight is higher than about 50,000, a solvent such as ketone or ether is used.

As the carbon powder to be used for the PEG-carbon powder systems, various forms of carbon powders can be used. That is, various types of carbon powder products ranging from amorphous carbon black to crystalline graphite, etc. are applicable. Also, the mixing ratio for them is as extensive as 5 to 45 wt%.

The amount of those with low bulk density, such as amorphous carbon black and acetylene black, can be small (i.e. low in ratio) for mixing, but those with high bulk density (bulk specific gravity), such as graphite, must be used in a large amount for mixing. The lower limit for the amount to be added is the actual use limit by the value of the PTCR resistance by which the heat produced in the resistor is defined through the relation $$Q = V^2/(R \cdot J)$$

where Q is the heat per second, V is the applied voltage, R is the resistance and J=4.2 Joule/cal. The upper limit is the point where the electric resistance characteristics which are completely identical with those of the carbon resisters are shown, which can be called the boundary between the resistance of carbon-dispersed system and the carbon resistance.

Hereunder a detailed description on this invention will be provided with reference to the embodiments.

EMBODIMENTS

Figure 4:
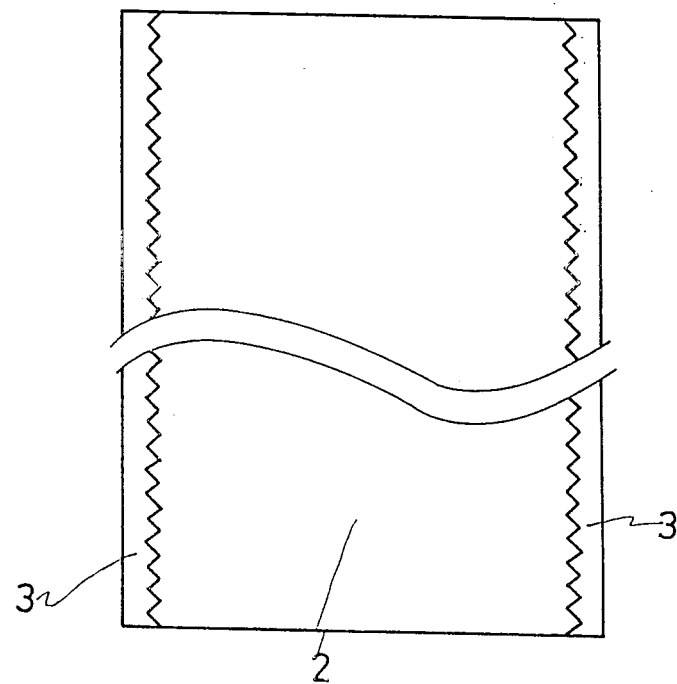
FIG. 4 is a partially omitted plan view showing the essential portion of the same heater.
Figure 5:
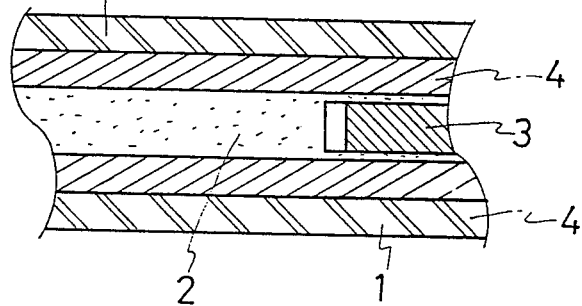
FIG. 5 is an enlarged sectional view showing the essential portion of the same heater.

PEG's (from Dai-ichi Kogyo Sieyaku Co., Ltd.) #600, #600+#1000 (7:3), #600+#1000 (3:7), #1000, #1540, #2000, #4000, #6000, #10000, and #20000 were used. After these PEG's were heated to the molten state, respectively, 27 wt% (however, only for #600, 28 wt%) of graphite (from Nishimura Kokuen Co., Ltd., 90–300M, average 300 mesh, 45 μm) was added to the respective PEG's. Then, they were mixed by agitation using an ordinary blender. The ten types of composites (PTCR) thus obtained were made into flexible plane heaters as described below, respectively. That is, by using the polyethylene terephthalate films (110 μm) 1, 80 mm in width and 300 mm in length and which have fiber layers 4 lining their internal surfaces, each of the above-mentioned composites 2 was sandwiched between the films 1 as shown in FIGS. 4 and 5. Then, on both sides, serrated or saw-tooth copper electrodes 3, 6 mm in width and 80 μm in thickness were provided. In this case, the layer thickness of the PTCR was 120 μm.

One hundred V was applied to each plane heater thus obtained. Then, the exothermic temperature was measured as a function of time. The results were as shown in FIG. 2. The exothermic temperatures after 20 minutes has passed are shown in Table 1.

The temperature was measured by adhering aluminum foil to the front and back surfaces of each plane heater, and a temperature sensor was placed in contact with the aluminum foil. Then the sensor was covered with a heat insulator (urethane foam), and the values indicated by the sensor were read. FIG. 3 shows the results of the foregoing measurement in a graphic form.

TABLE 1

| PEG in PTCR Composite | Steady Exothermic Temperature (°C.) |
| --- | --- |
| #600 | 6 |
| #600 + #1000(7:3) | 12 |
| #600 + #1000(3:7) | 16 |
| #1000 | 33 |
| #1540 | 40 |
| #2000 | 47 |
| #4000 | 52 |
| #6000 | 56 |
| #10000 | 58 |

TABLE 1-continued

| PEG in PTCR Composite | Steady Exothermic Temperature (°C.) |
|---|---|
| #20000 | 60 |

As should be apparent from Table 1 and FIG. 3, for the case when the carbon particles (in this case, graphite) are kept constant, when the molecular weight of PEG is varied. the steady state exothermic temperature can be varied. In other words, with increase in the molecular weight, the steady state exothermic temperature is increased depending on the former. Furthermore, through the mixing of the components with mutually different molecular weights, the additive property is nearly established. As a result, those having a steady state exothermic temperatures set at an optional temperature within the range of 6° to 60° C. can be provided.

As the other method to vary the steady state exothermic temperature of the PTCR composite, there is the addition of polypropylene glycol (hereafter, it will be appreciated to PPG). This method has already been proposed (Japanese laid-open Pat. No. 1984-162022), and in this method, the steady state exothermic temperature is decreased by the addition of PPG. This mechanism is different in function from that proposed in the present invention, and the effect shown by this method is assumed to be based on the steric action of the branched methylene group contained in PPG.

Through the use of the controlling method for the steady state exothermic temperature, that is provided by this invention, PTCR composites having the optional steady state exothermic temperatures in the range from 5° to 60° C. can be obtained. Also, the PTCR composites thus obtained are excellent in compatibility and show stability even when in the use for a long period of time. Consequently, they can maintain a specified temperature without requiring the use of any temperature control devices, such as a regulator. Accordingly, by using such composites, various types of heat insulating panels which can save energy consumption and which are highly reliable in safety can be obtained for a wide variety of uses.

What is claimed is:

1. A method for controlling the steady state exothermic temperature in heat sensitive-electrically resistant composites, that is characterized in that the steady state exothermic temperature is set to a necessary temperature by selecting at least two polyethylene glycols having different molecular weights within a range from 100 to 1,000,000 and mixing said at least two polyethylene glycols with 5 to 45 wt.% of carbon powder whereby a polyethylene glycol-carbon powder system heat sensitive-electrically resistant composite having a predetermined steady state exothermic temperature is produced.

2. A method for controlling the steady state exothermic temperature in heat sensitive-electrically resistant composites as set forth in claim 1, wherein the molecular weight of the polyethylene glycol is from 200 to 50,000.

* * * * *